Dec. 9, 1947. L. V. COLWELL 2,432,383
MACHINE TOOL ROTARY SPINDLE STABILIZER
Filed Aug. 25, 1944 2 Sheets-Sheet 1
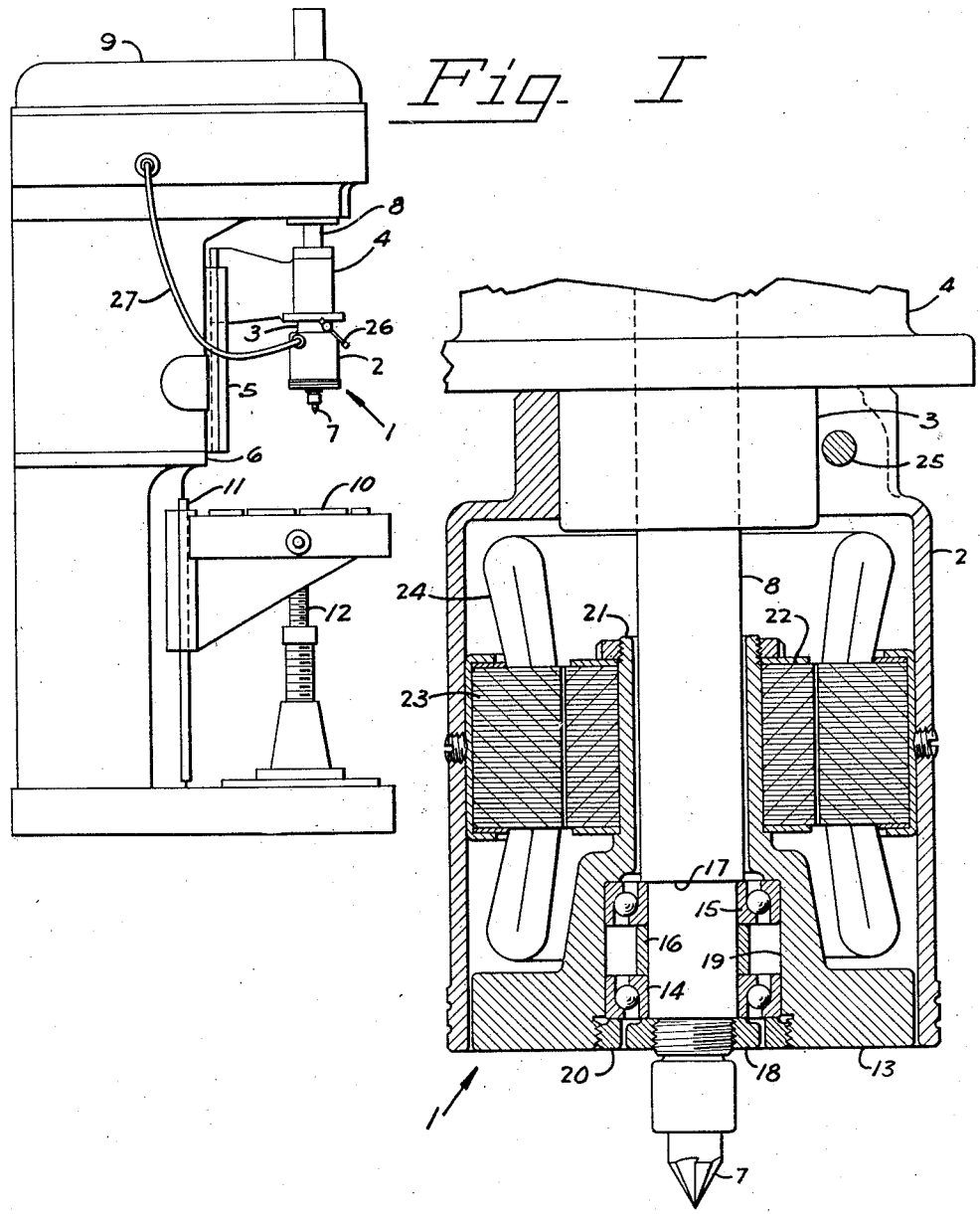
Fig. I
Fig. II
INVENTOR.
Lester V. Colwell
BY
Marshall & Marshall
ATTORNEYS Dec. 9, 1947.   L. V. COLWELL   2,432,383
MACHINE TOOL ROTARY SPINDLE STABILIZER
Filed Aug. 25, 1944   2 Sheets-Sheet 2
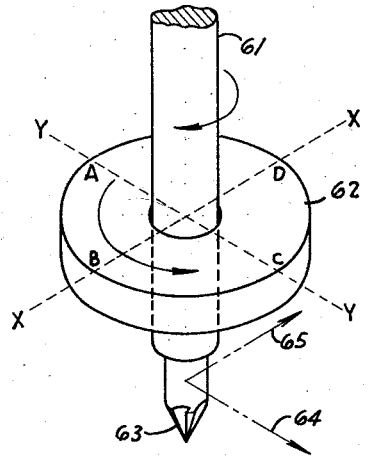
Fig. VI
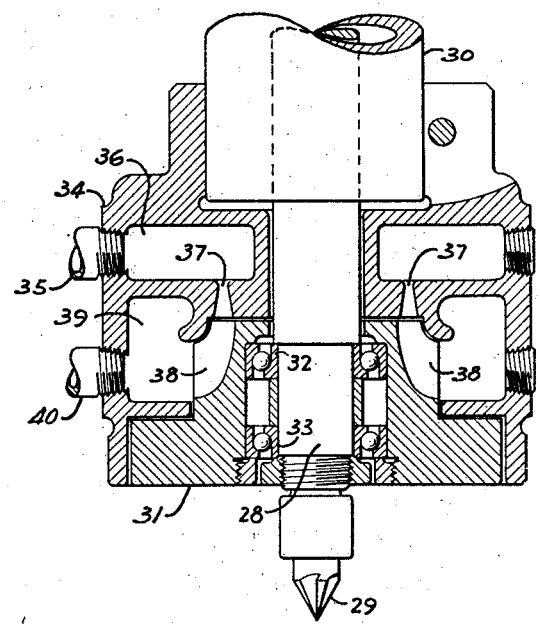
Fig. III
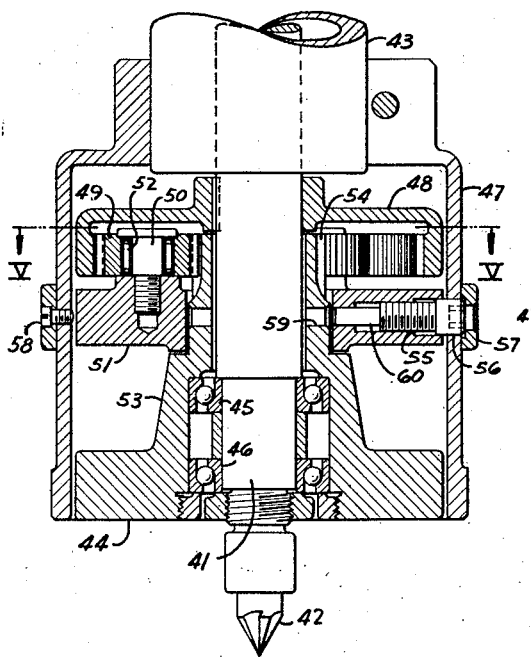
Fig. IV
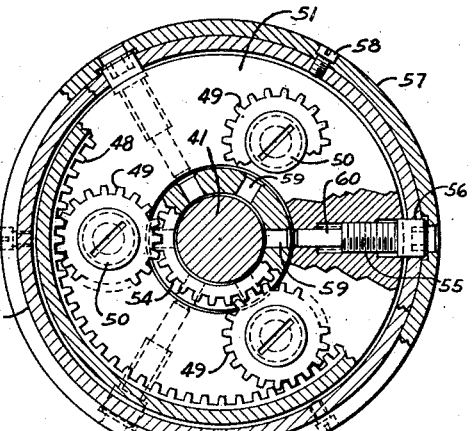
Fig. V
INVENTOR.
Lester V. Colwell
BY
Marshall & Marshall
ATTORNEYS Patented Dec. 9, 1947

2,432,383

UNITED STATES PATENT OFFICE 2,432,383

MACHINE TOOL ROTARY SPINDLE STABILIZER

Lester V. Colwell, Ann Arbor, Mich., assignor to Defiance Machine Works, Inc., Defiance, Ohio, a corporation of Ohio Application August 25, 1944, Serial No. 551,164

10 Claims. (Cl. 77—5)

This invention relates to metal cutting tools and in particular to a device which stabilizes the operation of a drill bit, countersink tool or similar structure.

When drills or countersinks are not adequately supported adjacent their cutting edges they are very likely to chatter and thus produce inferior work. Chatter is a relative vibration between a cutting tool and the work and apparently is excited by variations in cutting force. In a countersink or drill the variations in cutting force cause corresponding deflections of the cutter axis at right angles to the cutting edges experiencing the variations.

It is common practice in the art of drilling where high accuracy must be maintained to employ hardened bushings held in a jig over the work to guide the drill and thus prevent its lateral deflection. When high drilling speeds are used it is difficult to maintain adequate lubrication of these bushings.

It is an object of this invention to provide a rotating mass or rotor mounted adjacent the tool as near its cutting edge as possible to support the tool and prevent deflection and chatter.

Another object is to mount a rotor adjacent the cutting tool in such a manner that it may be rotated independently of the cutting tool.

A still further object is to mount a rotor concentric with and adjacent the cutting tool and to provide means for rotating it and the cutting tool in opposite directions so that the rotor by gyroscopic effect will cause that lip of the tool taking too heavy a cut to be deflected away from the work thus equalizing the cutting effort and minimizing chatter.

These and other objects and advantages are attained by the structure shown in the drawings.

In the drawings:

Figure I is a side elevation of a drill press embodying the invention.

Figure II is an enlarged vertical cross section of the tool stabilizing mechanism.

Figure III is a vertical cross section of the tool stabilizing mechanism showing another method of driving it.

Figure IV is a vertical cross section of the tool stabilizing mechanism illustrating still another method of supplying driving power.

Figure V is a sectional view taken along the line V—V of Figure IV.

Figure VI is a schematic illustration showing the direction of the stabilizing forces which are exerted when an independently rotating rotor is employed as a gyroscopic stabilizer.

These specific drawings are intended to merely illustrate preferred forms of the invention but not to define the limits of the invention.

A gyroscope has the property that when the rotor is revolving rapidly about an axis called the axis of spin, any rotation about an axis perpendicular to the axis of spin results in a force tending to rotate the gyroscope about an axis perpendicular to the axis of spin and the axis of rotation. The invention is the application of this principle of the gyroscope to stabilize a drilling tool and thus minimize chatter. To this end the drilling spindle is fitted with a heavy rotor adjacent the drilling tool and is so constructed that the rotor may be rotated either in the same direction as the spindle or in the reverse direction and that the rotational speed of the rotor is independent of the spindle. When the rotor is rotated rapidly it behaves as a gyroscope and resists any deflection from its plane of rotation. It thus provides a stabilizing force adjacent the cutting tool and consequently minimizes chatter by resisting deflection of the cutting tool from its intended path.

When the cutting force required by one lip of a drill or countersink increases over that required by the diametrically opposite lips the axis of the drill is deflected laterally in a direction perpendicular to the radius connecting the lips to the axis. Thus the instantaneous cutting speed of one lip is reduced and the tool is deflected such that the following lip is driven more deeply into the side of the hole. The lateral deflection of the drill point produces a slight rotation of the rotor about an axis perpendicular to its axis of spin. A corresponding precessional force is set up thereby which is generally parallel to the radius connecting the axis of the tool to that cutting edge requiring the greater force. If the rotor is rotating in the opposite direction from the spindle this precessional force tends to deflect the spindle and cutting tool in such direction as to reduce the depth of the cut. If the difference in cutting force arises from differences in tooth sharpness, the dull tooth requiring the greater force, rotation of the rotor in the same direction will tend to equalize the cut.

Examples of a construction to accomplish this result are shown in the drawings. A stabilizing mechanism 1 is enclosed within a housing 2 depending from and coaxial with the lower end of a bearing 3 forming part of a slide 4 which is reciprocable in ways 5 of a drill press frame 6. A cutting tool 7, which may be a drill, countersink, counterbore, etc., is attached to the lower end of a spindle 8 extending through the bearing 3 and upwardly into a head mechanism 9 of the drill press. The upper end of the spindle 8 is splined and fitted through driving gears so that the spindle may be rotated and reciprocated simultaneously. The drill press is further provided with an elevating table 10 guided on ways 11 and supported by an elevating screw 12.

The stabilizing mechanism as shown in detail in Figure II comprises a rotor 13 enclosed within the lower open end of the housing 2 and journaled by means of combination radial thrust ball bearings 14 and 15. The inner races of the bearings are separated by a spacer 16 and are clamped between a shoulder 17 on the spindle 8 and a lock nut 18 threaded on the lower end of the spindle. The outer races of the bearings are received in a bore 19 in the rotor 13 and are held in place by a threaded ring 20. As there is no spacer between the outer races, tightening the ring 20 applies a preload to the bearings and thus provides a rigid yet rotatable connection between the rotor 13 and the spindle 8.

A sleeve portion 21 of the rotor 13 is circumjacently disposed about the spindle 8 and carries an armature 22 of an electric motor whose stator 23 including windings 24 is suitably anchored within the housing 2. The upper end of the housing 2 is necked down and is bored to fit over the lower end of the bearing 3. One side of the housing is slotted and a bolt 25 provided with a handle 26 (Figure I) is provided to rigidly clamp the housing to the bearing 3. Power is supplied to the electric motor through a flexible cable 27 extending from the housing 2 into the head mechanism 9 of the drill press.

Because the rotor is journaled on the spindle and is capable of independent rotation, it may be given a different rotation than the spindle. The difference may be in speed, in speed and direction, or in direction alone. The rotor speed and direction is controlled solely by the electrical power delivered to the motor, the spindle merely serving as a support. When the difference in rotation between rotor and spindle is solely in speed, the direction being the same, the gyroscopic action tends to cause that side of the tool requiring the greater force to take a deeper cut. This is sometimes desirable when taking light cuts and the tool acts as if it were dull. When the difference in rotation is in direction and the rotor is turning rapidly, the gyroscopic action tends to relieve the depth of cut on the side requiring the greater cutting force.

It is also possible to drive a stabilizing rotor hydraulically utilizing either an oil turbine or an air turbine. An example of such a driving mechanism is shown in Figure III. A spindle 28 fitted with a tool 29 extends downwardly through a bearing 30 in the same manner as the spindle 8 extended through the bearing 3. A rotor 31 is journaled on the spindle 8 by means of preloaded ball bearings 32 and 33. A housing 34 is clamped onto the bearing 30 and extends downwardly to surround the outer edge of the rotor 31. The housing 34 is provided with a fluid inlet 35 opening into an entrance chamber 36 cored in the housing 34. A series of nozzles 37 direct fluid from the entrance chamber 36 against vanes 38 formed on the upper part of the rotor 31. After impinging upon the vanes 38 the fluid is collected in a receiver 39 and drawn off through an exit connection 40.

In this structure the velocity of the rotor is determined by the velocity of the fluid impinging upon the vanes 38 and may be controlled by controlling the pressure differential existing between the entrance chamber 36 and the collecting chamber 39. In case the rotor is driven by compressed air the chamber 39 may be opened directly to the atmosphere.

If the spindle is to be operated from medium to high speeds only it is not necessary that the rotor be independently driven as the same advantages may be obtained by driving it from the spindle through a step-up planetary transmission. Such a structure is illustrated in Figures IV and V. In these figures a spindle 41, similar to the spindle 8, carries a cutting tool 42 at its lower end and is journaled in a bearing 43 similar to the bearing 3. A heavy rotor 44 is journaled on the spindle 41 by means of preloaded ball bearings 45 and 46. A circular housing 47 depending from and clamped to the bearing 43 incloses the rotor 44 and the mechanism for driving it. This mechanism comprises an internally toothed gear 48 keyed to the spindle 41 between the rotor 44 and the bearing 43. A series of planet pinions 49 in mesh with the gear 48 are journaled on studs 50 secured to a disk 51. Needle bearings 52 are employed to minimize the friction between the pinions 49 and the studs 50. The rotor 44 is provided with a sleeve-like extension 53 circumjacently disposed about the spindle 41. The upper end of this sleeve 53 is provided with a series of teeth 54 meshing with the planet pinions 49. The disk 51 is held in place in the housing 47 by a series of screws 55 threaded into radial bores in the disk 51 with their cylindrical heads 56 fitting in corresponding holes in the housing 47. A ring 57 surrounding the housing 47 and held in place by three spaced set screws 58 prevents the screws 55 from working out.

In this example when the spindle 41 is turned clockwise, viewed from above, the internal gear 48 and the pinions 49 also revolve clockwise. The rotor 44, however, driven by the pinions 49 rotates in the reverse direction at a speed considerably higher than the speed of the spindle 41. This structure possesses all the advantages of those previously described except that the rotor can not be rotated rapidly when the spindle is turning slowly.

In some applications it is desirable that the rotor rotate in the same direction as the spindle 41. This is taken care of in the gear design by providing a series of radial bores 59 in the rotor sleeve 53 such that cylindrical projections 60 on the inner ends of the screws 55 may be engaged therein. The parts are so proportioned that when the cylindrical projections 60 are fully engaged in the bores 59 the heads 56 of the screws 55 are free of the wall of the housing 47. This locks the disk 51 to the rotor 44 thus immobilizing the pinions 49 and causing the rotor 44 to be rotated at the same speed and in the same direction as the spindle 41. This example of the invention thus accomplishes the same result as the others without the use of a separate power source but at the expense of limiting the rotor velocity to a definite value determined by the spindle velocity.

As was mentioned previously, when the rotor rotates in the opposite direction from the spindle its precessional force, when the spindle is deflected laterally by the work, is in such direction as to relieve the deflecting force and thus reduce the tendency to chatter. The relationship of the forces producing this effect is shown in Figure VI. A spindle 61 rotating clockwise, as viewed from above, is stabilized by a rotor 62 rotating counterclockwise. Suppose a lip 63 on one side of the tool to be taking too heavy a cut. The effect of this is to cause the spindle to be deflected along the line 64 away from the normal axis of rotation. Since the upper part of the spindle is guided in a bearing the deflection of the tool along the line 64 has the effect of rotating the rotor about the axis X—X. The combination of the spinning motion of the rotor 62 and its rotation about the axis X—X causes those particles of the rotor in the region ABC to describe a curvilinear path in space which curves upward. Since the particles attempt to follow a straight line the result is a downward force applied to the point B of the rotor parallel to the axis of spin. Similarly, an upward force is generated at the point D. The combination of these two forces tends to produce rotation about the axis Y—Y thus deflecting the spindle along the line 65. This deflection is thus in such direction as to draw the lip 63 away from its side of the hole and to increase the thickness of the chip cut by the diametrically opposed lip. The latter lip then generates a force tending to deflect the spindle in the reverse direction along the line 64, i. e. back to the normal axis of rotation.

If, as when taking light cuts, an increase in chip thickness apparently reduces the cutting force, the correction should be reversed. This design allows this by merely reversing the direction of rotation of the rotor.

In this manner, the provision of a rapidly rotating rotor on a relatively unsupported spindle allows the production of satisfactory work with a minimum of chatter.

In the drawings the invention has been illustrated as operating in connection with a countersinking tool. It is not limited to this use only but is equally satisfactory with drills or counterbores or in fact any multiedged rotating cutting tool. Nor is the usefulness of the device confined to a stationary drill press but it may also be used with portable tools where its advantages are even more apparent.

Having described the invention, I claim:

1. In a device of the class described, in combination, a drilling machine spindle carrying a balanced tool that is subjected to lateral forces, a bearing journaling said spindle, a housing mounted on said bearing and extending past the end of said bearing, a rotor journaled on said spindle substantially within said housing and between the bearing and the tool, and means in said housing for imparting to said rotor a rotation different from the rotation of said spindle.

2. In a device of the class described, in combination, a drilling machine spindle carrying a balanced tool that is subjected to lateral forces, a bearing journaling said spindle, a rotor journaled on spaced apart bearings on said spindle intermediate said bearing and the tool, a housing depending from said bearing and partly enclosing said rotor, an electric motor stator in said housing, and an armature on said rotor cooperating with said stator for driving said rotor independently of said spindle.

3. In a device of the class described, in combination, a drilling machine spindle carrying a balanced tool that is subjected to lateral forces, a bearing journaling said spindle, a rotor journaled on said spindle intermediate said bearing and the tool, a housing depending from said bearing and partly enclosing said rotor, an electric motor stator in said housing, and an armature on said rotor cooperating with said stator for rotating said rotor in the opposite direction from the direction of rotation of said spindle.

4. In a device of the class described, in combination, a drilling machine spindle carrying a balanced tool that is subjected to lateral forces, a bearing journaling said spindle, a rotor journaled on said spindle intermediate the bearing and the tool, a housing depending from said bearing and partly enclosing said rotor, and means in said housing for driving said rotor in the opposite direction from said spindle at a substantially greater speed than the speed of said spindle.

5. In a device of the class described, in combination, a drilling machine spindle carrying a balanced tool that is subjected to lateral forces, a bearing for said spindle, a rotor journaled on said spindle intermediate the bearing and the tool, a housing depending from said bearing partly enclosing said rotor, and gears in said housing for driving said rotor in the opposite direction from said spindle and at a substantially greater speed than said spindle.

6. In a device of the class described, in combination, a drilling machine spindle carrying a balanced tool that is subjected to lateral forces, a bearing for said spindle, a rotor journaled on said spindle intermediate said bearing and the tool, a housing depending from said bearing and substantially enclosing said rotor, and a turbine for imparting to said rotor a rotation different from the rotation of said spindle.

7. In a device of the class described, in combination, a drilling machine spindle carrying a balanced tool that is subjected to lateral forces, a bearing for said spindle, a rotor journaled on said spindle intermediate the bearing and the tool, a housing depending from said bearing and partly enclosing said rotor, and an air turbine for imparting to said rotor a rotation different from the rotation of said spindle.

8. In a device of the class described, in combination, a drilling machine spindle carrying a balanced tool that is subjected to lateral forces, a bearing for said spindle, a rotor journaled on said spindle intermediate the bearing and the tool, a housing depending from said bearing partly enclosing said rotor, and an oil turbine for imparting to said rotor a rotation different from the rotation of said spindle.

9. In a device of the class described, in combination, a spindle adapted to drive a cutting tool, the spindle being subject to lateral deflecting forces produced by unequal engagement of opposite sides of the tool with a work piece, a rotor journaled on the spindle intermediate a support for the spindle and the tool, and means for rotating the rotor in such a direction and speed that the gyroscopic forces resulting from the lateral deflection of the spindle tend to reduce the inequality of engagement of the cutting tool with the work piece and the lateral deflection of the spindle.

10. In a device of the class described having a spindle subject to lateral deflecting forces produced between a spindle carried cutting tool and a work piece, means for resisting the lateral deflecting forces comprising a rotor journaled on the spindle between a bearing journaling the spindle and the spindle carried tool, a housing mounted on the bearing and substantially enclosing the rotor, and means in said housing for imparting rotary motion to the rotor.

LESTER V. COLWELL.

REFERENCES CITED

The following references are of record in the file of this patent:

UNITED STATES PATENTS

| Number | Name | Date |
|---|---|---|
| 2,144,064 | Johnson | Jan. 17, 1939 |
| 2,027,666 | Bedford | Jan. 14, 1936 |
| 1,304,278 | Dessez | May 20, 1919 |

FOREIGN PATENTS

| Number | Country | Date |
|---|---|---|
| 354,635 | Great Britain | Aug. 13, 1931 |